(12) United States Patent
Ushiroda

(10) Patent No.: US 6,212,403 B1
(45) Date of Patent: *Apr. 3, 2001

(54) WIRELESS TELEPHONE BATTERY CHARGING WHILE PERFORMING DATA COMMUNICATIONS

(75) Inventor: Hitoshi Ushiroda, Higashihiroshima (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,164

(22) Filed: Feb. 25, 1998

(30) Foreign Application Priority Data

Jul. 3, 1997 (JP) ................................. 9-177996

(51) Int. Cl.⁷ ........................... H04B 1/38; H04M 1/00
(52) U.S. Cl. ......................... 455/557; 455/573; 455/572
(58) Field of Search ........................... 455/572, 573, 455/574, 557

(56) References Cited

U.S. PATENT DOCUMENTS

| | | | |
|---|---|---|---|
| 5,036,532 | * 7/1991 | Metroka et al. | 455/572 |
| 5,511,240 | * 4/1996 | Nishiyama | 455/573 |
| 5,528,667 | * 6/1996 | Steffensen et al. | 455/573 |
| 5,566,226 | * 10/1996 | Mizoguchi et al. | 455/558 |
| 5,797,089 | * 8/1998 | Nguyen | 455/557 |
| 5,870,615 | * 2/1999 | Bar-On et al. | 713/310 |
| 5,925,942 | * 7/1999 | Theobald | 455/573 |

FOREIGN PATENT DOCUMENTS

| | | |
|---|---|---|
| 0 494 780 | 7/1992 | (EP) . |
| 0 545 088 | 6/1993 | (EP) . |
| 4-72946 | 3/1992 | (JP) . |
| 5-130010 | 5/1993 | (JP) . |
| 8-130773 | 5/1996 | (JP) . |
| 8-237345 | 9/1996 | (JP) . |
| 9-162960 | 6/1997 | (JP) . |
| WO 96/21900 | 7/1996 | (WO) . |

* cited by examiner

*Primary Examiner*—Reinhard Eisenzopf
*Assistant Examiner*—Eliseo Ramos-Feliciano
(74) *Attorney, Agent, or Firm*—Nixon & Vanderhye P.C.

(57) ABSTRACT

A portable wireless communication device performing data communications through a network includes a secondary battery and an interface portion detachably connected to an external data terminal, for transmitting data to and receiving data from the external data terminal and for receiving an electric power from the external data terminal. The portable wireless communication device is alternately operated with at least one of an electric power from the secondary battery and the electric power input from the external data terminal through the interface portion.

7 Claims, 1 Drawing Sheet

WIRELESS TELEPHONE BATTERY CHARGING WHILE PERFORMING DATA COMMUNICATIONS

BACKGROUND OF THE INVENTION

1. Field of the Invention

The present invention relates to a portable wireless communication device used in the Personal Handy Phone System (PHS) or the like.

2. Description of the Related Art

It is well-known that portable wireless communication devices perform data communications through a network. Some of the portable wireless communication devices are capable of being connected to an external data terminal of a personal computer, etc. Such a portable wireless communication device transmits data to and receives data from the external data terminal under the condition of being connected to the external data terminal, and interconnects the external data terminal and the network.

The portable wireless communication device as described above is usually operated by a secondary battery built therein. The secondary battery is charged by being placed on a charger dedicated to the portable wireless communication device.

However, the above-mentioned conventional portable wireless communication device is not adapted to be connected to the external data terminal while placed on the charger. The interconnection between the external data terminal and the network is performed only with an electric power from the built-in secondary battery. Therefore, the interconnection is effected only until the secondary battery is exhausted.

Compared with normal calls, a longer period of time is likely to be spent on, for example, data communications performed during the operation of the external data terminal (personal computer) as in personal computer communications, and data communications requiring a time for collecting information as in the internet.

Therefore, in the case where the interconnection between the external data terminal and the network through the portable wireless communication device is performed only with the electric power from the secondary battery as described above, the data communications may be interrupted due to the exhaustion of the secondary battery, which prevents the data communications from being performed in a normal manner.

Even when assuming the structure in which the portable wireless communication device is capable of being connected to the external data terminal under the condition of being placed on the charger, there is a problem that the peripheral I/O of the portable wireless communication device becomes complicated.

SUMMARY OF THE INVENTION

A portable wireless communication device performing data communications through a network of the present invention includes: a secondary battery; and an interface portion detachably connected to an external data terminal, for transmitting data to and receiving data from the external data terminal and for receiving an electric power from the external data terminal, wherein the portable wireless communication device is operated with at least one of an electric power from the secondary battery and the electric power input from the external data terminal through the interface portion.

In one embodiment of the present invention, the above-mentioned portable wireless communication device includes: a data terminal circuit portion for transmitting data to and receiving data from the external data terminal through the interface portion; and a network circuit portion for transmitting data to and receiving data from the network, the portable wireless communication device interconnecting the external data terminal and the network.

In another embodiment of the present invention, in a case where the electric power input from the external data terminal through the interface portion is excessive, the secondary battery is charged with the excessive electric power.

In another embodiment of the present invention, in a case where the electric power input from the external data terminal through the interface portion is insufficient, the insufficient electric power is compensated for with the electric power from the secondary battery.

In another embodiment of the present invention, the above-mentioned portable wireless communication device includes an external electric power rejecting portion for rejecting the electric power from the external data terminal through the interface portion.

In another embodiment of the present invention, the above-mentioned portable wireless communication device includes an external electric power rejecting portion for rejecting the electric power from the external data terminal through the interface portion and stopping a supply of the electric power to the network circuit portion.

Thus, the invention described herein makes possible the advantage of providing a portable wireless communication device capable of interconnecting an external data terminal and a network for a long period of time without using a charger.

This and other advantages of the present invention will become apparent to those skilled in the art upon reading and understanding the following detailed description with reference to the accompanying figures.

DESCRIPTION OF THE PREFERRED EMBODIMENTS

Figure 1:
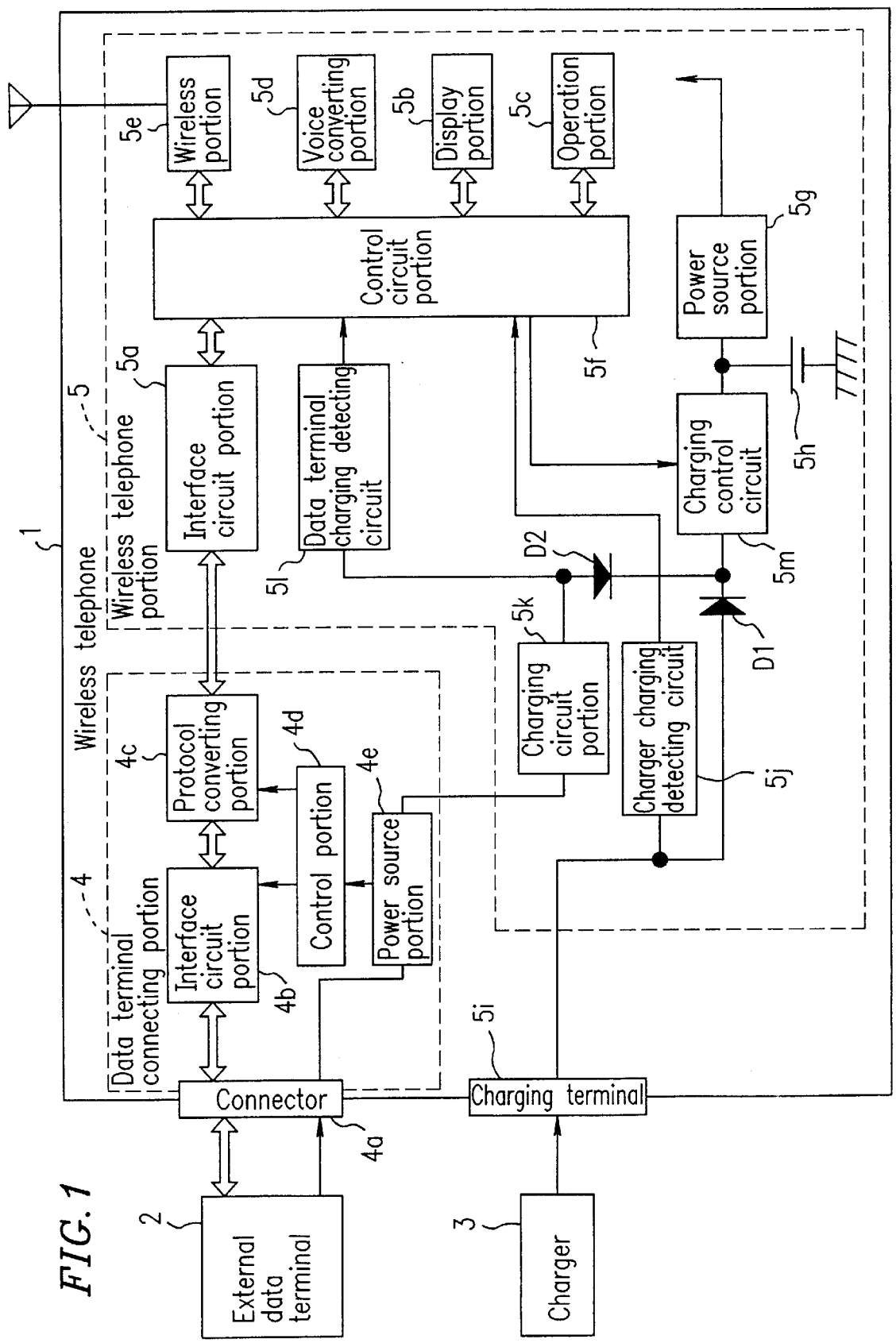
FIG. 1 is a block diagram showing an embodiment of a portable wireless communication device of the present invention.

Hereinafter, the present invention will be described by way of an illustrative embodiment with reference to the drawing.

FIG. 1 is a block diagram showing an embodiment of a portable wireless communication device of the present invention. A portable wireless communication device 1 of the present embodiment is a portable wireless telephone which includes a data terminal connecting portion 4 and a wireless telephone portion 5.

The data terminal connecting portion 4 includes a connector 4a, an interface circuit portion 4b, a protocol converting portion 4c, a control portion 4d, and a power source portion 4e. An external data terminal 2 is detachably connected to the connector 4a. The external data terminal 2 is a personal computer, for example. Data is transmitted/received between the interface circuit portion 4b and the external data terminal 2 when the external data terminal 2 is connected to the connector 4a. The interface circuit portion 4b outputs data from the external data terminal 2 to the protocol converting portion 4c, and transmits data from the protocol converting portion 4c to the external data terminal 2. The protocol converting portion 4c converts a data transmission procedure of the external data terminal 2 to a data transmission procedure of the wireless telephone portion 5, or vice versa, thereby enabling data to be transmitted/received between the external data terminal 2 and the network. The control portion 4d has control over the interface circuit portion 4b and the protocol converting portion 4c.

Electric power is supplied from the external data terminal 2 to the power source portion 4e when the external data terminal 2 is connected to the connector 4a. The power source portion 4e supplies the electric power from the external data terminal 2 to the interface circuit portion 4b, the protocol converting portion 4c, the control portion 4d, etc.

The wireless telephone portion 5 includes an interface circuit portion 5a, a display portion 5b, an operation portion 5c, a voice converting portion 5d, a wireless portion 5e, a control or network circuit portion 5f, a power source portion 5g, a secondary battery 5h, a data terminal charging detecting circuit 5l, a charging control circuit 5m, two diodes D1 and D2, a charger charging detecting circuit 5j, a charging circuit portion 5k, and a charging terminal 5i.

The interface circuit portion 5a inputs data from the protocol converting portion 4c to the control circuit portion 5f, and outputs data from the control circuit portion 5f to the protocol converting portion 4c. The display portion 5b performs various display functions.

The operation portion 5c has various keys, and the portable wireless telephone 1 is operated by pressing these keys. The voice converting portion 5d includes an ADPCM codec, a microphone, a receiver, etc. (not shown).

The voice converting portion 5d encodes a voice signal output from the microphone into voice data, decodes the voice data into a voice signal, and adds the voice signal to the receiver. The wireless portion 5e performs wireless communications with a base station. A network (not shown, e.g., a public channel network) including the base station is connected to the wireless portion 5e by conventional wireless communication technology.

In the case where a telephone call is made through the portable wireless telephone 1, a call is originated by pressing keys of the operation portion 5c. In response to the origination of a call, the control circuit portion 5f allows predetermined data to be transmitted/received between the base station of the network and the wireless telephone 1 through the wireless portion 5e. Thus, the wireless portion 5e is connected to the network. Furthermore, the control circuit portion 5f calls the data terminal of a computer of a communication partner through the network so as to connect the wireless portion 5e to the terminal of a computer of the communication partner through the network.

When receiving voice data from the voice converting portion 5d when the wireless portion 5e is connected to the data terminal of a computer of the communication partner, the control circuit portion 5f transmits the voice data from the wireless portion 5e to the data terminal of a computer of the communication partner through the network. Moreover, when the wireless portion 5e receives voice data from the data terminal of a computer of the communication partner through the network, the control circuit portion 5f outputs the voice data to the voice converting portion 5d.

In the case where the external data terminal 2 and the network are interconnected through the portable wireless telephone 1, predetermined communication software is started in the external data terminal 2 (personal computer), thereby generating data required for calling. Thereafter, the data is transmitted to the data terminal connecting portion 4. In the data terminal connecting portion 4, the data is input to the protocol converting portion 4c through the interface circuit portion 4b. In the protocol converting portion 4c, the data is converted to comply with the wireless telephone portion communication protocol and transmitted to the wireless telephone portion 5.

In the wireless telephone portion 5, the data is input to the control circuit portion 5f through the interface circuit portion 5a. In response to the data, the control circuit portion 5f allows predetermined data to be received/transmitted between the base station of the network and the wireless telephone 1 through the wireless portion 5e, thereby connecting the wireless portion 5e to the network. Furthermore, the control circuit portion 5f calls the data terminal of a computer of the communication partner through the network, thereby connecting the wireless portion 5e to the data terminal of a computer of the communication partner through the network.

When receiving data from the external data terminal 2 through the data terminal connecting portion 4 when the wireless portion 5e is connected to the data terminal of a computer of the communication partner, the control circuit portion 5f transmits the data from the wireless portion 5e to the data terminal of a computer of the communication partner through the network. When receiving data from the data terminal of a computer of the communication partner through the wireless portion 5e, the control circuit portion 5f outputs the data to the external data terminal 2 through the data terminal connecting portion 4.

In addition, FIG. 1 includes a charger 3 which is detachably connected to the charging terminal 5i. A current is supplied from the charger 3 to the secondary battery 5h and the power source portion 5g through the diode D1 and a charging control circuit 5m when the charger 3 is connected to the charging terminal 5i. The charger charging detecting circuit 5j detects a current from the charger 3, and informs the control circuit portion 5f of the detection result.

When electric power is supplied from the external data terminal 2 to the power source portion 4e when the external data terminal 2 is connected to the connector 4a, electric power is supplied from the power source portion 4e to the charging circuit portion 5k. The charging circuit portion 5k generates and outputs a charging current, which controls a current and a constant voltage with respect to the charging current. The current from the charging circuit portion 5k is supplied to the secondary battery 5h and the power source portion 5g through the diode D2 and the charging control circuit 5m. The data terminal charging detecting circuit 51 detects a current from the external data terminal 2, and informs the control circuit portion 5f of the detection result.

The power source portion 5g supplies an electric power from the secondary battery 5h to each part of the wireless telephone portion 5.

The charging control circuit 5m performs an on/off control with regard to a charging current (i.e., allows a charging current to flow to the secondary battery 5h or blocks it).

The supply of electric power in the case where the external data terminal 2 is connected to the connector 4a in the portable wireless communication device 1 with the above-mentioned structure will be described in detail. In this example it is assumed that the charger 3 is not connected to the charging terminal 5i.

First, when the external data terminal 2 is connected to the connector 4a, an electric power is supplied from the external data terminal 2 to the power source portion 4e through the connector 4a of the data terminal connecting portion 4. The power source portion 4e therefore supplies the electric power to both the data terminal connecting portion 4 and the charging circuit portion 5K of the wireless telephone portion 5. The charging circuit portion 5k generates a charging current, and supplies the current to the secondary battery 5h and the power source portion 5g through the diode D2 and the charging control circuit 5m.

If the portable wireless communication device 1 is on standby in the above-mentioned state, the wireless portion 5e merely intermittently receives data for the purpose of monitoring a control channel without using a speech channel. In this case, since an electric power consumed for wireless communications is very small, most of the current supplied from the charging circuit portion 5k through the diode D2 and the charging control circuit 5m is supplied to the secondary battery 5h. More specifically, most of the current supplied from the power source portion 4e of the data terminal connecting portion 4 to the wireless telephone portion 5 is consumed for charging the secondary battery 5h.

Furthermore, if data is being transmitted/received between the portable wireless communication device 1 and the network, the wireless portion 5e transmits/receives data through the speech channel, and the amount of electric power consumed by the wireless portion 5e increases. In this case, most of the current is supplied from the charging circuit portion 5k to the power source portion 5g through the diode D2 and the charging control circuit 5m, and only a very small charging current flows through the secondary battery 5h. Thus, most of the charging current is supplied from the power source portion 5g to each part of the wireless telephone portion 5, and is consumed for the operation of the wireless telephone portion 5.

In the case where a current is not sufficient even when all the current supplied from the power source portion 4e of the data terminal connecting portion 4 to the wireless telephone portion 5 is supplied for operating the wireless telephone portion 5, a current output from the secondary battery 5h is added to the current from the power source portion 4e, and the combined current is supplied to each part of the wireless telephone portion 5 through the power source portion 5g.

Thus, a normal operation of the wireless telephone portion 5 is maintained.

On the other hand, when a current is being supplied from the power source portion 4e of the data terminal connecting portion 4 to the wireless telephone portion 5, the data terminal charging detecting circuit 51 detects the current, and informs the control circuit portion 5f of the detection result. Thus, the control circuit portion 5f recognizes receipt of electric power from the power source portion 4e of the data terminal connecting portion 4. When a user of the portable wireless communication device 1 presses keys of the operation portion 5c in this state to designate the prohibition of current charging by the data terminal connecting portion 4, in response thereto, the control circuit portion 5f controls the charging control circuit 5m so as to block the current from the data terminal connecting circuit 4. As a result, the current from the data terminal connecting portion 4 stops flowing to the secondary battery 5h, and only the current output from the secondary battery 5h is supplied to each part of the wireless telephone portion 5 through the power source portion 5g, whereby the wireless telephone portion 5 is operated.

For example, in the case where the external data terminal 2 is driven by a secondary battery built therein, if the secondary battery 5h of the portable wireless communication device 1 is charged with electric power from the secondary battery of the external data terminal 2, and the portable wireless communication device 1 is operated with electric power from the secondary battery of the external data terminal 2, the secondary battery of the external data terminal 2 is immediately exhausted. Therefore, in such a case, electric power from the external data terminal 2 is rejected, whereby the life of the secondary battery of the external data terminal 2 can be prolonged, and the data communications by the external data terminal 2 can be performed in a normal manner for a long period of time.

As described above, according to the present embodiment, electric power from the external data terminal 2 can be used for operating the portable wireless communication device 1. Furthermore, the secondary battery 5h built in the portable wireless communication device 1 can be charged with the electric power from the external data terminal 2 as well as the current from the charger 3. Furthermore, in the case where electric power from the external data terminal 2 is not sufficient for operating the wireless telephone portion 5, a normal operation of the wireless telephone portion 5 can be maintained by adding the current from the secondary battery 5h.

In the present embodiment, only the wireless telephone portion 5 is operated with an electric power from the secondary battery 5h. However, the wireless telephone portion 5 and the data terminal connecting portion 4 may be operated together. Furthermore, in the present embodiment, a portable wireless telephone is illustrated as the portable wireless communication device 1. However, the present invention is not limited thereto. The present invention can be applied to other kinds of communication devices. Furthermore, although a personal computer is illustrated as the external data terminal, other kinds of data terminals may be used.

As described above, according to the present invention, when connected to the external data terminal 2, the interface circuit portion 4b not only transmits data to and receives data from the external data terminal 2 but also receives electric power from the external data terminal 2. The portable wireless communication device 1 of the present invention is operated with electric power input from the external data terminal 2 through the interface circuit portion 4b, so that data can be transmitted to and received from the external data terminal and the network for a long period of time without consuming the built-in secondary battery 5h.

For example, data communications performed using the external data terminal as in personal computer communications and data communications requiring a time for collecting information as in the internet, which take a long period of time, can be performed in a normal manner without any interruption.

Compared with the structure in which the portable wireless communication device is connected to the external data terminal when placed on the charger, the peripheral I/O of the portable wireless communication device according to the present invention is less complicated.

In one embodiment, the portable wireless communication device may include a data terminal circuit portion for transmitting data to and receiving data from the external data terminal, and a network circuit portion for transmitting data to and receiving data from the network, thereby interconnecting the external data terminal and the network.

In one embodiment, in the case where an excessive electric power is input from the external data terminal through the interface circuit portion, the secondary battery may be charged with the excessive electric power. Because of this, the chances for charging the secondary battery increase, and the charging amount of the secondary battery increases, so that the operation time of the portable wireless communication device with only electric power from the secondary battery increases.

In one embodiment, in the case where insufficient electric power is input from the external data terminal through the interface circuit portion, the insufficient electric power may be compensated for with electric power from the secondary battery. This enables a required amount of current to be supplied to the portable wireless communication device even when the current for operating the portable wireless communication device is varied, whereby the portable wireless communication device can be driven stably.

In one embodiment, an external electric power rejecting portion for rejecting electric power from the external data terminal through the interface circuit portion may be provided. Alternatively, an external 5 electric power rejecting portion for rejecting electric power from the external data terminal through the interface circuit portion and stopping the supply of the electric power to the network circuit portion may be provided.

For example, in the case where the external data terminal is driven by a secondary battery built therein, if the secondary battery of the portable wireless communication device is charged with and operated with an electric power from the secondary battery of the external data terminal, the secondary battery of the external data terminal is immediately consumed. Therefore, an electric power from the external data terminal is rejected, whereby the life of the secondary battery of the external data terminal can be prolonged, and the data communications by the external data terminal can be performed in a normal manner for a long period of time.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A portable wireless communication device performing data communications through a network, comprising:
   a secondary battery; and
   an interface portion detachably connected to an external data terminal, for transmitting data to and receiving data from the external data terminal and for receiving an electric power from the external data terminal without an impedance circuit,
   wherein the portable wireless communication device is alternately operated with at least one of an electric power from the secondary battery and the electric power input from the external data terminal through the interface portion.

2. A portable wireless communication device according to claim 1, comprising:
   a data terminal circuit portion for transmitting data to and receiving data from the external data terminal through the interface portion; and
   a network circuit portion for transmitting data to and receiving data from the network,
   the portable wireless communication device interconnecting the external data terminal and the network.

3. A portable wireless communication device according to claim 1, wherein in a case where the electric power input from the external data terminal through the interface portion is excessive, the secondary battery is charged with the excessive electric power.

4. A portable wireless communication device according to claim 1, wherein in a case where the electric power input from the external data terminal through the interface portion is insufficient, the insufficient electric power is compensated for with the electric power from the secondary battery.

5. A portable wireless communication device according to claim 1, comprising an external electric power rejecting portion for rejecting the electric power from the external data terminal through the interface portion.

6. A portable wireless communication device according to claim 2, comprising an external electric power rejecting portion for rejecting the electric power from the external data terminal through the interface portion and stopping a supply of the electric power to the network circuit portion.

7. A portable wireless communication device performing data communications through a network, comprising:
   a secondary battery; and
   an interface portion detachably connected to an external data terminal, for transmitting data to and receiving data from the external data terminal and for receiving an electric power from the external data terminal without an impedance circuit,
   wherein the portable wireless communication device is alternately operated with at least one of an electric power from the secondary battery and the electric power input from the external data terminal in accordance with an electric power source of the external data terminal.

* * * * *